(12) United States Patent
Linn

(10) Patent No.: US 9,038,248 B1
(45) Date of Patent: May 26, 2015

(54) LEASH ATTACHABLE BAG HOLDER

(71) Applicant: Corey D. Linn, Saint Cloud, MN (US)

(72) Inventor: Corey D. Linn, Saint Cloud, MN (US)

( * ) Notice: Subject to any disclaimer, the term of this patent is extended or adjusted under 35 U.S.C. 154(b) by 0 days.

(21) Appl. No.: 13/738,977

(22) Filed: Jan. 10, 2013

(51) Int. Cl.
*A01K 29/00* (2006.01)
*A01K 23/00* (2006.01)

(52) U.S. Cl.
CPC ............... *A01K 23/005* (2013.01); *A01K 29/00* (2013.01)

(58) Field of Classification Search
CPC ............... A01K 23/005; A01K 27/003; A45F 2200/0566; A45F 5/00; A45F 2005/002; A45F 2005/1013; E01H 1/1206; E01H 2001/1286; A47G 25/1442; B65F 1/1415; B65G 7/12; F16B 45/00; Y10S 224/925
USPC ............. 24/298, 299, 300, 301, 302; 294/1.3, 294/1.4, 1.5
See application file for complete search history.

(56) References Cited

U.S. PATENT DOCUMENTS

| | | | |
|---|---|---|---|
| 1,586,147 A | 5/1926 | Flory | |
| 2,013,061 A * | 9/1935 | Loewinsohn | ................... 24/49.1 |
| 3,786,780 A * | 1/1974 | Pezzino | ........................... 294/1.5 |
| 3,848,841 A | 11/1974 | Rafeldt | |
| 3,977,422 A | 8/1976 | Cabaluna | |
| 4,010,970 A * | 3/1977 | Campbell | ....................... 294/1.5 |
| 4,069,994 A | 1/1978 | Wharmby | |
| 4,091,976 A * | 5/1978 | Morse | ............................ 294/142 |
| 4,645,251 A | 2/1987 | Jacobs | |
| 4,677,697 A | 7/1987 | Hayes | |
| 4,768,818 A | 9/1988 | Kolic | |
| 4,979,833 A | 12/1990 | Cook | |
| 5,000,500 A | 3/1991 | Almog | |
| 5,083,797 A * | 1/1992 | Vartija et al. | ................... 473/424 |
| 5,118,201 A | 6/1992 | Cook | |
| 5,280,843 A * | 1/1994 | Vartija et al. | ................... 473/576 |
| 5,400,572 A * | 3/1995 | Peck et al. | ....................... 53/459 |
| 5,438,708 A | 8/1995 | Jacovitz | |
| 5,568,955 A | 10/1996 | Giuliano et al. | |
| 6,058,882 A | 5/2000 | Leutholt | |
| 6,073,590 A | 6/2000 | Polding | |
| 6,116,668 A | 9/2000 | Carpol | |
| 6,237,971 B1 | 5/2001 | Ward Gilley | |
| 6,386,606 B1 * | 5/2002 | Marshall | ........................ 294/1.5 |
| 6,464,394 B1 | 10/2002 | Galomb | |
| 6,494,619 B1 | 12/2002 | Sulpizio | |
| 6,611,961 B2 | 9/2003 | Demeur et al. | |
| 6,702,317 B2 * | 3/2004 | Wang | ............................. 280/727 |
| 6,827,491 B2 | 12/2004 | Kohl et al. | |
| 6,997,362 B1 * | 2/2006 | Pidcock | ......................... 224/607 |
| 7,753,322 B1 * | 7/2010 | Peterson | ........................... 248/99 |
| 7,819,787 B2 * | 10/2010 | Kassel | ............................. 482/122 |
| 8,038,188 B1 | 10/2011 | Nolan-Brown | |
| 8,201,862 B2 | 6/2012 | Langley | |

(Continued)

*Primary Examiner* — Robert J Sandy
*Assistant Examiner* — David Upchurch
(74) *Attorney, Agent, or Firm* — Albert W. Watkins

(57) ABSTRACT

A leash attachable animal excrement bag holder has a carabineer for engaging a leash, body-supported apparel or the like, a flexible, resilient and open-biased support hoop, and a bag suspended from the support hoop. A slide has a body and first and second holes passing entirely through. The first hole encompasses the support hoop at a first distinct location and the second hole encompasses the support hoop at a second distinct location. The slide operatively traverses the support hoop and thereby alters a bias of the support hoop from an open orientation suitable to receive or remove animal excrement bags to a more nearly closed orientation suitable to retain animal excrement bags. A coupling engages the support hoop with the carabineer.

11 Claims, 2 Drawing Sheets

(56) References Cited

U.S. PATENT DOCUMENTS

| | | | |
|---|---|---|---|
| 2002/0162196 A1* | 11/2002 | Joubert et al. | 24/300 |
| 2005/0173477 A1* | 8/2005 | Scott | 224/148.6 |
| 2006/0226303 A1* | 10/2006 | Weisenfeld | 248/95 |
| 2007/0101950 A1* | 5/2007 | Medlin | 119/792 |
| 2007/0220717 A1* | 9/2007 | Brinson | 24/298 |
| 2007/0222240 A1* | 9/2007 | Sherman | 294/1.5 |
| 2007/0277352 A1* | 12/2007 | Maron et al. | 24/298 |
| 2008/0017121 A1* | 1/2008 | Mauro | 119/161 |
| 2009/0152884 A1* | 6/2009 | Ruscil et al. | 294/1.5 |
| 2009/0315350 A1* | 12/2009 | Allen | 294/1.3 |
| 2010/0249646 A1* | 9/2010 | Wynne et al. | 600/562 |
| 2011/0132952 A1* | 6/2011 | Peterson-Malesci | 224/660 |
| 2011/0225779 A1* | 9/2011 | Jones | 24/301 |

\* cited by examiner

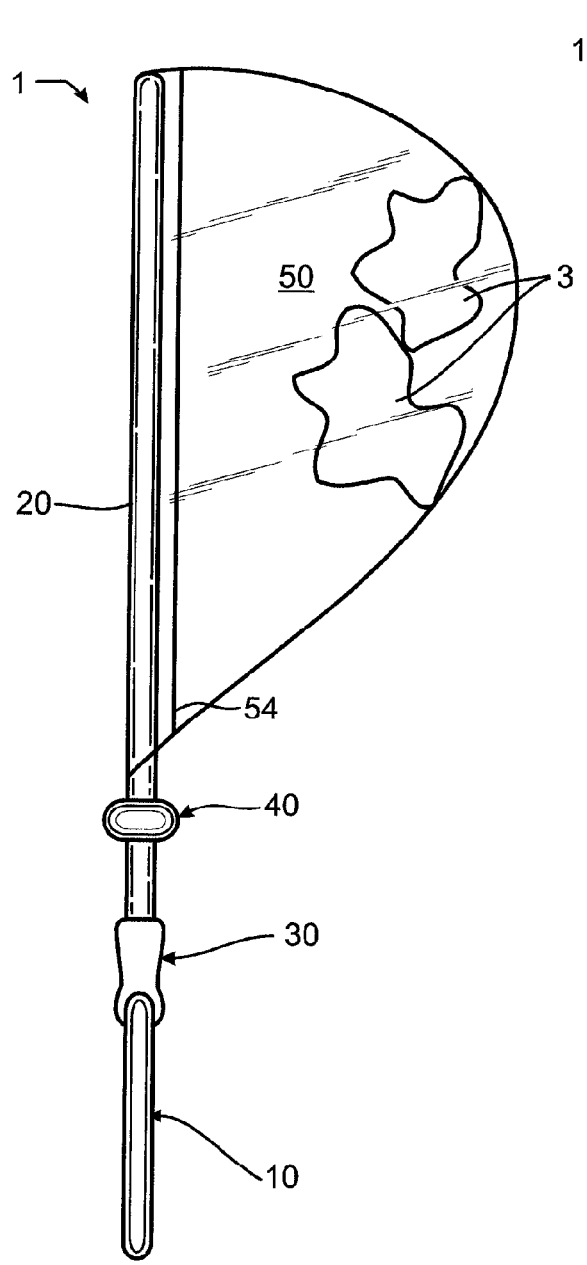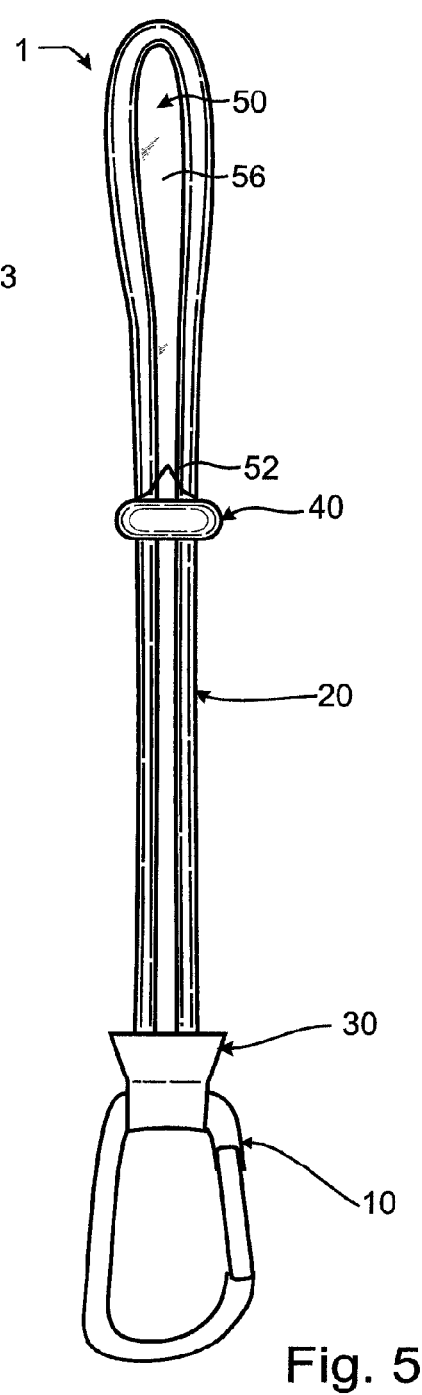
Fig. 4
Fig. 5

LEASH ATTACHABLE BAG HOLDER

BACKGROUND OF THE INVENTION

1. Field of the Invention

The present invention pertains generally to handling using hand and hoist-line implements, and more particularly to a sanitary handler for pet droppings.

2. Description of the Related Art

All living creatures require energy in the form of food, and naturally produce waste. Presumably throughout much of unrecorded history, both man and animals would have excreted waste wherever convenient to the being. With low population densities of man and animals, nature provided the tools for sufficiently rapid decomposition of the waste to not generally interfere with the animals' life cycle.

Gradually, as population densities increased, so did the need for more sanitary waste management. This may have been primarily to reduce both the likelihood and the spread of disease, but also was likely supported by a desire to reduce the unpleasant exposure to waste in the course of an ordinary day, and also a desire for an increase in the privacy of individuals.

Initially, only human waste was of concern and so sanitary facilities were developed. Original facilities for people included pit toilets with and without enclosures, and eventually, with the development of indoor plumbing, water closets and bathrooms were developed. These served people well, but animal droppings including those of horses and dogs were allowed to be left at the discretion or convenience of the animal. Since horses were the primary mode of transportation for many centuries, there was no effective way to eliminate or fully remove the excrements of animals, nor was the animal waste considered particularly hazardous or bothersome.

With the gradual understanding and acceptance of microbiological theories such as presented by Louis Pasteur, mankind learned that animal waste presented another vector for disease transmission, and that, as a result, the waste could be harmful to humans either through direct contact or through consumption or contact with waters contaminated by the animal waste. Modern technology has enabled mankind to not only identify microbes including bacteria, viruses, and yeasts and fungi, but also to identify a particular source with certainty. As a result, a number of disease vectors that were previously uncertain have been determined. Such particularity has enabled mankind to identify a disease outbreak, determine the microbial cause, which for exemplary purposes might be the well-known *E. Coli*, and then identify the source down to a particular farm and animals such as manure from cattle on the farm.

This has furthered a gradual evolution in the thoughts of many people on the acceptability of animal waste being left solely to the convenience of the animal. While there may have always been an unpleasantness associated with animal excrement, the recognition of potential life-threatening harm has further fueled a wide-spread promulgation of local rules and ordinances that require pet owners to take responsibility for the removal of animal waste produced by their pets.

Whether through an inherent awareness of social responsibility or because of local rules and ordinances, many modern pet owners must promptly clean up excrement. Wile many animals produce unpleasant and potentially harmful excrement, dogs are a most common source of dropped excrement in public areas, in part because dogs are not normally trained to use a litter box and also because necessary exercise tends to stimulate dogs to excrete waste. As a person walks the dog or allows the dog to run, the stimulation of activity and new sights and smells will very commonly cause the dog to excrete waste. Since the dog is walking or moving about, this waste will frequently be dropped along public trails, sidewalks, in public parks, or in other areas where the waste will either preferably or through mandate need to be removed.

Most commonly, the pet owner will carry low-cost plastic bags. These bags can be folded about the person's hand like a mitten or glove to allow the pet owner to grasp the excrement. Then the bag may be folded from the person's hand to fully encompass and contain the excrement within the bag. When the walk is completed, or at any other convenient time during the walk, one or more of these used bags may be disposed of in a suitable trash receptacle.

While many pet owners still use ordinary and general-purpose bags, a number of bags have been designed specifically for this purpose. Exemplary U.S. patents, the teachings and contents which are incorporated herein by reference, include: U.S. Pat. No. 4,645,251 by Jacobs, entitled "Glove-like waste disposal system"; U.S. Pat. No. 4,677,697 by Hayes, entitled "Clean up glove"; U.S. Pat. No. 4,768,818 by Kolic, entitled "Disposable litter pick-up mitt"; U.S. Pat. No. 5,438,708 by Jacovitz, entitled "Manual waste collection, containment, and disposal device"; U.S. Pat. No. 5,568,955 by Giuliano et al, entitled "Device for individual collection of pet excrements"; U.S. Pat. No. 6,058,882 by Leutholt, entitled "Petpotty-pickup"; U.S. Pat. No. 6,116,668 by Carpol, entitled "Animal solid waste collection"; U.S. Pat. No. 6,237,971 by Ward Gilley, entitled "Sleeved invertible glove for collection and disposal of materials"; and U.S. Pat. No. 6,611,961 by Demeur et al, entitled "Reversible mit for disposal of waste debris".

While this method of excrement removal is in concept both efficient and effective, most dog owners quickly realize that there are a number of drawbacks. Among these are the difficulty associated with cleaning up excrement without contaminating not only the bag interior but also the exterior. In such case, subsequent transport of the bag until a trash receptacle can be reached is difficult to do without accidental smearing of the excrement onto the person, their clothing or other belongings. Additionally, if a small and more economical and environmentally friendly bag is used to clean the excrement, the bag may also be very difficult to close and seal, and an open bag is more hazardous to carry for any length of time. The pet owner's attention is normally directed to the activities of the dog and surroundings, and so it is easy and common for a distracted owner to accidentally make contact with the excrement. Even with a much larger bag, the closing of the bag can also be difficult to do cleanly if the excrement has accidentally been smeared onto the exterior of the bag or near the bag opening. The low-cost bags are also generally quite thin, and so may be accidentally torn or punctured while being carried, again undesirably exposing the person directly to the waste. In addition, holding a used bag for an extended period is quite undesirable.

In an effort to provide a better way to transport used bags, various artisans have proposed apparatus suitable for this purpose. Exemplary U.S. patents, the teachings and contents which are incorporated herein by reference, include U.S. Pat. No. 6,073,590 by Polding, entitled "Dog leash with bag container", which provides a bag container stitched to a dog leash; and U.S. Pat. No. 8,038,188 by Nolan-Brown, entitled "Pet waste cleanup kit", which provides an organized cleanup kit that hangs from a leash, and from which used bags may be suspended.

A number of other artisans have devised various other ways to assist with pet excrement removal and disposal. Exemplary patents, the teachings and contents which are incorporated herein by reference, include: U.S. Pat. No. 3,977,422 by Cabaluna, entitled "Concealed litter bag cane device"; U.S. Pat. No. 5,000,500 by Almog, entitled "Disposable plastic bags"; U.S. Pat. No. 5,400,572 by Peck et al, entitled "Poop scooping and packaging assembly"; and U.S. Pat. No. 8,201,862 by Langley, entitled "Device for collecting and containing solid or liquid substances, including animal or human waste". Each of these patents illustrate various alternatives to the process of manually folding a bag about a person's hand, and are used to directly pick up animal excrement.

The following additional patents are incorporated herein by reference for their various teachings and enablements, including: U.S. Pat. No. 1,586,147 by Flory, entitled "Hand bag"; U.S. Pat. No. 3,848,841 by Rafeldt, entitled "Refuse containers, particularly for vehicles"; U.S. Pat. No. 4,069,994 by Wharmby, entitled "Bag holder"; U.S. Pat. No. 4,979,833 by Cook, entitled "Multiple use bag"; U.S. Pat. No. 5,118,201 by Cook, entitled "Bag mouth closure structure"; U.S. Pat. No. 6,464,394 by Galomb, entitled "Handle-pour spout closure for flexible packages, flexible packages including the same and method of making such flexible packages"; U.S. Pat. No. 6,494,619 by Sulpizio, entitled "Disposable lawn bag"; U.S. Pat. No. 6,827,491 by Kohl et al, entitled "Wide open feature for reclosable bags"; and U.S. Pat. No. 7,753,322 by Peterson, entitled "Portable bag holder employing elastic band". In addition to the patents mentioned herein above, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a leash attachable animal excrement bag holder operative to selectively receive, retain and release animal excrement bags. A coupling engages with a support hoop. A bag is suspended from the support hoop. A slide is operative to travel along the support hoop and alter a bias of the support hoop from an open orientation to a more nearly closed orientation.

OBJECTS OF THE INVENTION

Exemplary embodiments of the present invention solve inadequacies of the prior art by providing a coupling, a flexible, resilient and open-biased support hoop, a bag suspended from the support rod, and a slide operative to slide along the support hoop and alter the bias from an open orientation to a more nearly closed orientation.

A first object of the invention is to provide a collapsible sack operative to receive, retain and protect animal excrement-containing bags, that may further preferably be readily cleaned. A second object of the invention is to provide a durable exterior bag which preferably provides greater protection against tears and punctures than an individual excrement bag. Another object of the present invention is to selectively bias the aforementioned collapsible sack between an open position and a closed position using a simple manual adjustment. A further object of the invention is to provide a releasable coupling to a person, leash or other apparatus, thereby permitting the invention to be transported in an unimpeding manner, without simultaneous manual effort or intervention. Yet another object of the present invention is to enable reasonable manufacture, intuitive assembly, and reliable operation.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 4 illustrates the preferred embodiment leash attachable bag holder of FIG. 1 from a side elevational view.

FIG. 5 illustrates the preferred embodiment leash attachable bag holder of FIG. 1 from a top plan view and in a generally closed position.

DESCRIPTION OF THE PREFERRED EMBODIMENT

Figure 1:
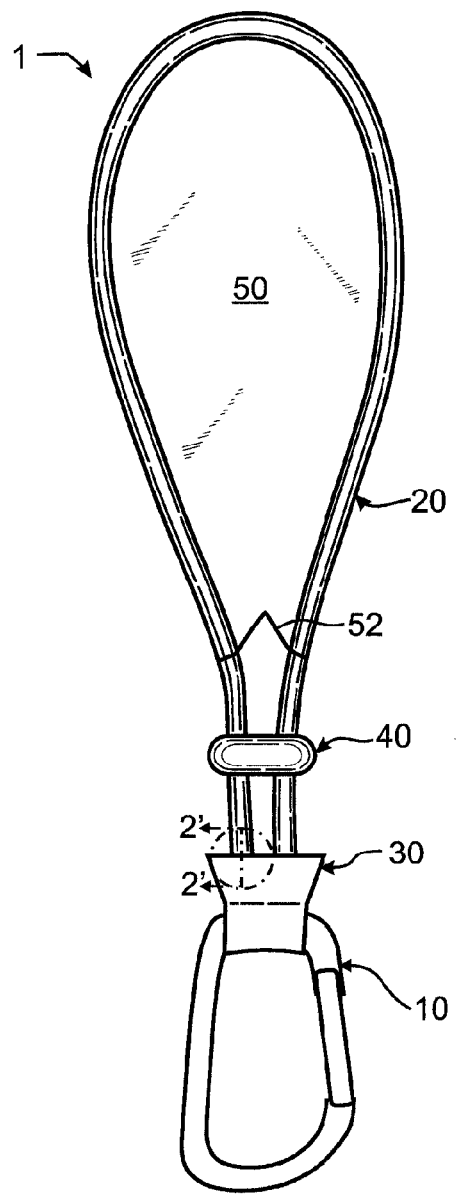
FIG. 1 illustrates a preferred embodiment leash attachable bag holder designed in accord with the teachings of the present invention from a top plan view and in an open position.

Manifested in the preferred embodiment, the present invention provides a leash attachable bag holder 1 having a carabineer 10, a coupling 30, a flexible, resilient and open-biased support hoop 20, a bag 50 suspended from support hoop 20, and a slide 40 operative to slide along support hoop 20 and alter the bias from an open orientation as illustrated in FIG. 1 to a more nearly closed orientation illustrated in FIG. 5.

While carabineer 10 is preferred, due at least in part to the ready commercial availability thereof, familiarity that most people have with proper operation, and selective and secure engagement with other objects, other suitable fasteners and couplers may be substituted therefor. Carabineer 10, or a suitable alternative, provides an apparatus for securing and supporting the remaining parts of leash attachable bag holder 1 from a suitable support such as a self-retracting or standard dog leash, a belt loop, or any other suitable support. This enables leash attachable bag holder 1 to be selectively and securely carried by a person in a hands-free manner while walking a dog or otherwise moving about, and be readily removed therefrom upon completion of the walk or other movement.

Coupling 30 may take any suitable geometry, but as illustrated in the preferred embodiment leash attachable bag holder 1 coupling 30 provides a passage for carabineer 10 and also provides a secure termination for each end of support hoop 20. Support hoop 20 may be formed integrally with coupling 30, but in the preferred embodiment leash attachable bag holder 1, at least one end of support hoop 20 is preferably separable from coupling 30. This permits slide 40 to be slipped onto support hoop 20 by passing a free end of support hoop 20 first through hole 42 in slide 40, and then sliding slide 40 along support hoop 20 and around the sharp bend in support hoop 20 distal to coupling 30, and then further sliding until slide 40 is once again nearly adjacent with coupling 30. Bag 50 preferably has a fold seam forming a sleeve 54 in bag 50 that almost but incompletely encircles opening 56 into bag 50. Support hoop 20 will now be threaded through sleeve 54 in bag 50. Next, the free end of support hoop 20 may be passed through hole 44, so that slide 40 is in the position illustrated in FIG. 1, with both slide 40 and bag 50 threaded onto support hoop 20. Finally, any free ends of support hoop 20 may then be secured to coupling 30.

Figure 2:
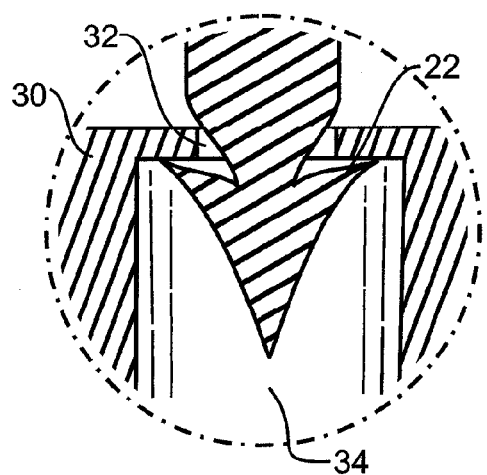
FIG. 2 illustrates a preferred engagement securing a first end of a preferred support hoop to a preferred coupling, each used in the preferred embodiment leash attachable bag holder of FIG. 1, by enlarged sectional view taken along line 2' of FIG. 1.

While any suitable geometry that may be known in the art of couplings and fasteners may be used for securement, in the preferred embodiment leash attachable bag holder 1, the separable end of support hoop 20 is secured to coupling 30 as illustrated in FIG. 2 by providing a reduced diameter entry opening 32 into an enlarged diameter chamber 34 formed in coupling 30. A conical generally arrowhead end 22 terminates support hoop 20 on at least one end thereof, and has an exterior diameter at the point smaller than entry opening 32, and an exterior diameter distal to the point slightly larger than entry opening 32. This means that when arrowhead end 22 is inserted into entry opening 32, it will at first pass freely therein, until enough of the point has passed through that the arrowhead end 22 exterior diameter equals or preferably slightly exceeds the interior diameter of entry opening 32. At this position, there will be substantial friction between entry opening 32 and arrowhead end 22. Nevertheless, if arrowhead end 22 is driven further into entry opening 32, then either or both of arrowhead end 22 and entry opening 32 will preferably plastically deform slightly but sufficiently to allow the largest diameter of arrowhead end 22 to pass through entry opening 32 and into chamber 34. Once this has happened, either or both of arrowhead end 22 and entry opening 32 will preferably plastically return to their original shape. Using the geometry of the preferred embodiment arrowhead end 22 illustrated in FIG. 2, once arrowhead end 22 has passed fully into chamber 34, support hoop 20 is secured thereto, since arrowhead end 22 will not be removable from coupling 30 without severe damage or destruction.

In preferred embodiment leash attachable bag holder 1 as illustrated in FIG. 2, end 22 has a cross-section resembling an arrowhead, with a point and increasing diameter, followed by an abrupt transition to a neck. This abrupt transition to the smaller diameter neck region leads to ease of insertion but difficult removal. In an alternative embodiment contemplated herein, end 22 could alternatively resemble a ball, having a generally circular cross-section, which would allow both insertion and removal. Two opposed conical surfaces, rather than the single conical surface of FIG. 2, could likewise be provided, again allowing both insertion and removal. As may be understood then, any suitable cross-section for end 22 may be used that produces a desired insertion force curve and desired removal force curve.

In preferred embodiment leash attachable bag holder 1, support hoop 20 terminates distally to arrowhead end 22 directly into coupling 30 and does not need to be removable or separated therefrom, and so may be molded or otherwise formed simultaneously with coupling 30. In other words, support hoop 20 and coupling 30 may optionally be formed as a single unit in a single molding or other forming process. However, where appropriate or otherwise desirable, both ends of support hoop 20 may alternatively terminate with an arrowhead or other similar end 22.

Figure 3:
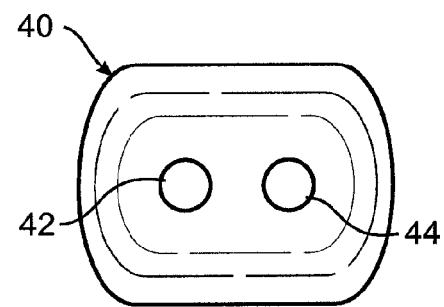
FIG. 3 illustrates the preferred slide used in the preferred embodiment leash attachable bag holder of FIG. 1 from a front elevational view.

In an alternative embodiment, slide 40 may be fabricated from two separable halves, such as for exemplary purposes taken along a horizontal axis passing through holes 42, 44 in FIG. 3. Slide 40 may then be placed about an already formed and closed support hoop 20 simply by placing one half of slide 40 above support hoop 20 and the other half below support hoop 20, and then fastening or securing the two halves of slide 40 together. In this alternative embodiment, bag 50 must be adhered to support hoop 20 either prior to closing hoop 20, or by other means, for exemplary purposes only and not solely limiting the present invention thereto as illustrated in the Peterson patent incorporated by reference herein above.

FIGS. 1 and 5 illustrate preferred embodiment leash attachable bag holder 1 from a top plan view in an open position and from a top plan view in a generally closed position, respectively. The open position illustrated in FIG. 1 is preferably attained by forming support hoop 20 of semi-rigid material that provides some resilience, and which thereby intrinsically takes the shape as generally illustrated therein. While in preferred embodiment leash attachable bag holder 1 the cross-section of support hoop 20 is circular and operative with circular holes 42, 44 in slide 40, there is no requirement that support hoop 20 be circular wire, and other cross-sectional geometries are contemplated herein. Further, the material, the geometry or both may be used to bias support hoop into the open position illustrated in FIG. 1. When slide 40 is moved away from or more distal relative to coupling 30, the close spacing between holes 42 and 44 will draw support hoop 20 together, thereby substantially reducing the size of top opening 56 into bag 50. In the process, there will likely be some bunching of sleeve 54, but this bunching is not consequential to the operation of preferred embodiment leash attachable bag holder 1. To help to accommodate the varying shape of opening 56 into bag 50, a small V-shaped notch 52 may optionally be formed into bag 50, preferably at the time of initial fabrication.

Bag 50 as illustrated is translucent or transparent, but may be of any desired transparency or color. A benefit of a transparent or translucent material is the ability to more readily determine the cleanliness or lack thereof of the bag material. Nevertheless, there may be times where a person would prefer to conceal any excrement bags 3 carried within bag 50, such as illustrated for exemplary purposes in FIG. 4, and so may prefer an opaque or less transparent material.

Most preferably, bag 50 will be of somewhat heavier construction or otherwise have greater intrinsic strength than any excrement bags 3 supported therein, to help to protect and preserve the excrement bags until disposal. Additionally, most preferably the entirety of preferred embodiment leash attachable bag holder 1 will be of materials resistant to water and ordinary cleaning solutions, so that preferred embodiment leash attachable bag holder 1 may be cleaned at will by a person.

The materials used in the fabrication of preferred embodiment leash attachable bag holder 1 and any alternative embodiments thereof is not critical to the workings of the present invention, and so metals, plastics, composites, laminates or other various materials and combinations of materials may be used. Nevertheless, and as aforementioned, materials that are resistant to water and ordinary cleaning solutions are preferred, and support hoop 20 will most preferably be intrinsically self-supporting and simultaneously flexible and resilient, in order to maintain the desired bias to alternatively open and close bag 50.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:
1. A leash attachable animal excrement bag holder operative to selectively receive, retain and release animal excrement bags, comprising:
   a support hoop;
   a coupling adapted to operatively couple said support hoop to a leash;

a bag suspended from said support hoop and adapted to operatively selectively receive, retain and release said animal excrement bags;

a slide adapted to operatively slide along said support hoop and alter a bias of said support hoop from an open orientation to a more nearly closed orientation and thereby operatively close said bag and retain said animal excrement bags within said bag; and an opening into a chamber within said coupling, said opening having a smaller inside diameter than a diameter of said chamber, and at least one end of said support hoop further comprises a head that at a termination has a diameter smaller than said inside diameter of said opening and which first increases in diameter with distance from said termination to a diameter greater than said inside diameter of said opening and subsequently reaches a reduced diameter neck smaller than said inside diameter of said opening.

2. The leash attachable animal excrement bag holder of claim 1, wherein said coupling further comprises a carabineer.

3. The leash attachable animal excrement bag holder of claim 1, wherein said support hoop further comprises a self-supporting, resilient, semi-rigid material.

4. The leash attachable animal excrement bag holder of claim 1, wherein a first end of said support hoop is unitary with said coupling, and a second end of said support hoop distal to said first end further comprises a termination selectively secured with said coupling.

5. The leash attachable animal excrement bag holder of claim 4, wherein said bag further comprises a sleeve adjacent to and incompletely encircling an opening into said bag, said support hoop second end operatively passing through said sleeve prior to being selectively secured with said coupling.

6. The leash attachable animal excrement bag holder of claim 1, wherein said slide further comprises a body having first and second holes passing entirely through said slide body, said first hole encompassing said support hoop at a first distinct location and said second hole encompassing said support hoop at a second distinct location.

7. An animal excrement bag holder, comprising:

a coupling;

a self-supporting, resilient, semi-rigid and open-biased support hoop;

a bag suspended from said support hoop adapted to operatively selectively receive, retain and release said animal excrement bags; and a slide having a body, first and second holes passing entirely through said slide body, said first hole encompassing said support hoop at a first distinct location and said second hole encompassing said support hoop at a second distinct location, said slide adapted to operatively traverse said support hoop and thereby alter a bias of said support hoop from said open bias to a closed bias and thereby operatively close said bag; and an opening into a chamber within said coupling, said opening having a smaller inside diameter than a diameter of said chamber, and at least one end of said support hoop further comprises a head that at a termination has a diameter smaller than said inside diameter of said opening and which first increases in diameter with distance from said termination to a diameter greater than said inside diameter of said opening and subsequently reaches a reduced diameter neck smaller than said inside diameter of said opening.

8. The animal excrement bag holder of claim 7, wherein said coupling further comprises a carabineer.

9. The animal excrement bag holder of claim 7, wherein a first end of said support hoop is unitary with said coupling, and a second end of said support hoop distal to said first end further comprises a termination selectively secured with said coupling.

10. The animal excrement bag holder of claim 9, wherein said bag further comprises a sleeve adjacent to and incompletely encircling an opening into said bag, said support hoop second end operatively passing through said sleeve prior to being selectively secured with said coupling.

11. The animal excrement bag holder of claim 7, wherein said support hoop at least one end is operatively insertable into and not removable from said opening into said coupling.

* * * * *